UNITED STATES PATENT OFFICE.

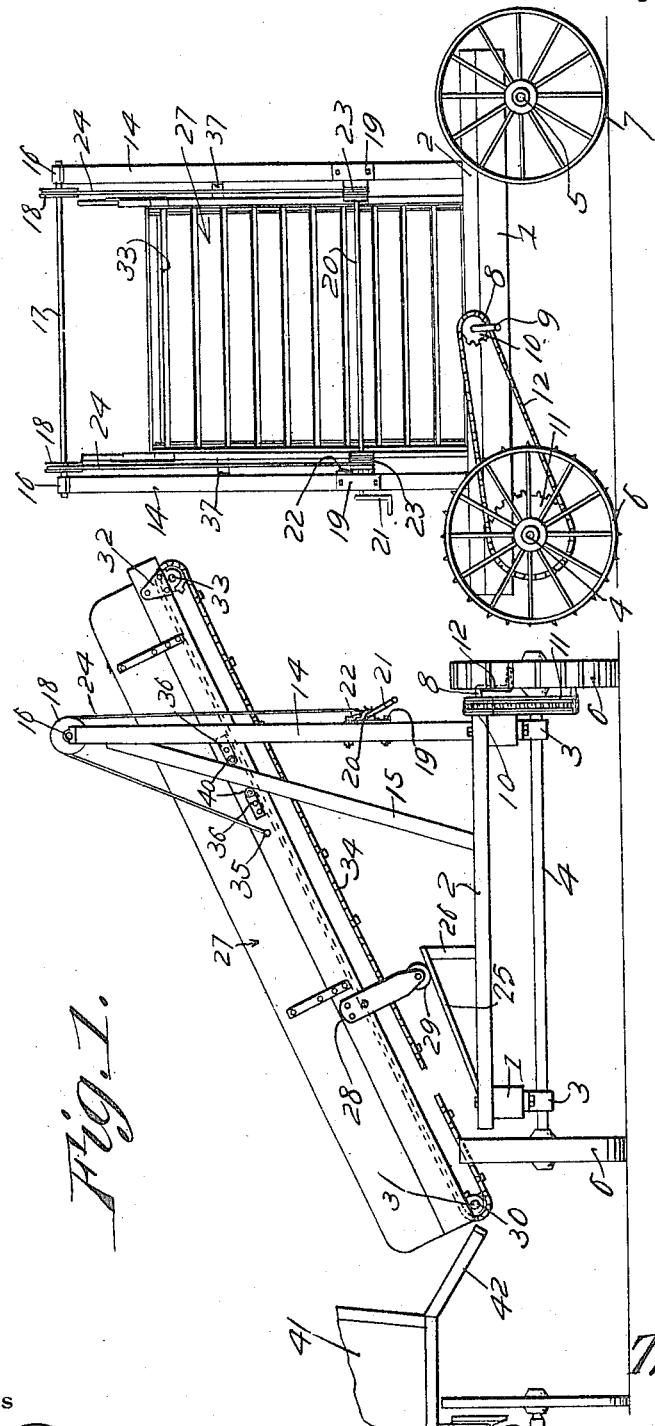

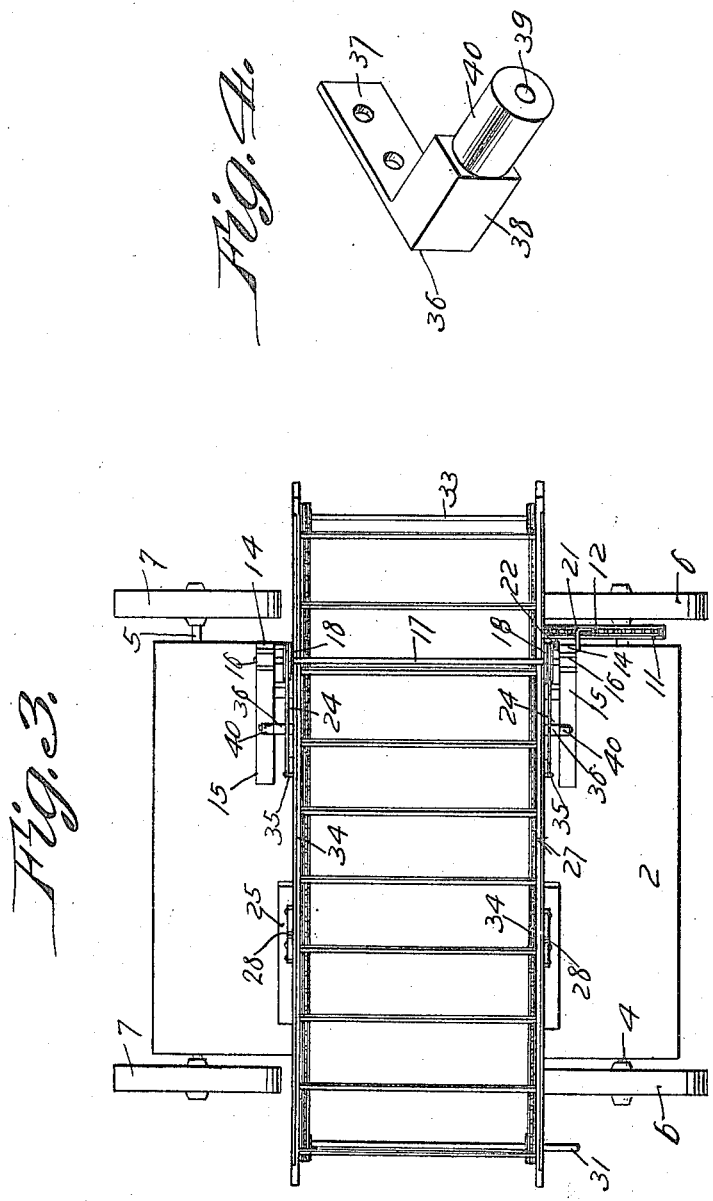

THOMAS MAHONEY, OF DORRANCE, KANSAS.

GRAIN-STACKING DEVICE.

1,234,363.    Specification of Letters Patent.    Patented July 24, 1917.

Application filed June 2, 1916. Serial No. 101,376.

*To all whom it may concern:*

Be it known that I, THOMAS MAHONEY, a citizen of the United States, residing at Dorrance, in the county of Russell and State of Kansas, have invented a new and useful Grain-Stacking Device, of which the following is a specification.

The device forming the subject matter of this application is adapted to be employed in connection with a header to deposit headed grain in a stack.

The invention aims to provide novel means whereby the inner, upper end of an inclined frame, supporting a conveyer, may be moved inwardly and outwardly, so that the discharge end of the conveyer may be positioned properly with respect to the vertical center of the stack which is being formed.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawing:

Figure 1 shows in end elevation, a stacking device constructed in accordance with the present invention;

Fig. 2 is a side elevation of the grain stacker;

Fig. 3 is a top plan of the structure shown in Fig. 2; and

Fig. 4 is a detail perspective showing one of the brackets.

In the accompanying drawings, there is shown a vehicle comprising a frame 1 supporting a platform 2. The frame 1 of the vehicle carries bearings 3 in which are journaled for rotation, axles 4 and 5 carrying, respectively, ground wheels 6 and ground wheels 7. Journaled on the frame 1 of the vehicle, adjacent one side thereof, as shown best in Fig. 2, is a short shaft 8 which may be rotated by means of a crank 9 or in any other suitable manner. Secured to the short shaft 8 is a sprocket wheel 10. A larger sprocket wheel 11 is secured to the rotatable axle 4. About the sprocket wheels 10 and 11 is trained a driving chain 12.

By rotating the short shaft 8, the sprocket wheels 10 and 11, coacting with the chain 12, will rotate the axle 4 and the ground wheels 6, the vehicle thus being advanced or retracted with respect to the stack which is being formed, the object of such an operation being to position the conveyer mechanism, hereinafter described, properly with respect to the stack.

Fixed to and upstanding from the main frame 1 of the vehicle adjacent the outer edge thereof is an auxiliary frame which may comprise upright standards 14 secured to the platform 1, the standards 14 being sustained by inclined braces 15, connected at their upper ends with the standards, and connected at their lower ends with the platform 2. Mounted on the upper ends of the standards 14 of the auxiliary frame are bearings 16 on which is journaled a shaft 17 carrying sheaves 18 located relatively near to the standards 14. Mounted on the standards 14 near to the platform 2 are bearings 19 in which is journaled a winding shaft 20 operated by means of a crank 21, or in any other suitable manner. A reverse rotation of the winding shaft 20 is prevented by means of a pawl and ratchet mechanism 22. Secured to the winding shaft 20 and alined vertically with the sheaves 18 are drums 23. Flexible elements 24 are secured at their lower ends to the drums 23. The flexible elements 24 are carried upwardly across the sheaves 18, and are carried downwardly to the rear of the braces 15, in a manner obvious when Fig. 1 of the drawings is inspected. The function of the flexible elements 24 will be made manifest hereinafter.

Secured to the platform 2 of the vehicle adjacent its inner edge are upwardly inclined tracks 25, the outer ends of which are upheld upon supports 26 assembled with the platform 2. The numeral 27 designates generally, a conveyer frame, which, if desired, may be made up of side walls and a bottom. Mounted on the inclined conveyer frame 27 near to the inner end thereof are depending brackets 28 carrying rollers 29 adapted to traverse the tracks 25. Bearings 30 are connected with the conveyer frame 27 adjacent its inner end, the bearings 30 supporting for rotation, a shaft 31, adapted to be connected with a source of power (not shown). Bearings 32 are mounted on the conveyer frame 27 adjacent the outer end thereof, the bearings 32 supporting for rotation a shaft 33. Trained about the shafts 33 and 31 and operated by the shaft 31 is a belt conveyer 34. The lower extremities of the flexible elements 24 are secured as shown at 35 to the side walls of the conveyer frame 27. Attached to the side walls of the conveyer frame 27, are pairs of brackets 36, one of which is shown in detail in Fig. 4. Each bracket 36 may comprise a foot plate 37, secured to the conveyer frame 27, an arm 38 projecting from the foot plate at right angles thereto, and a stub shaft 39 on the end of the arm. Journaled on the stub shafts 39 which project outwardly from the side portions of the conveyer frame, and held to the stub shafts for rotation thereon, are guide wheels 40 engaging the inner and outer edges of the inclined braces 15.

In practical operation, the vehicle may be moved along by manipulating the shaft 8 in the manner hereinbefore set forth.

When it is desired to raise the outer end of the conveyer 7 and to adjust the same with respect to the vertical center of the stack which is being formed the winding shaft 29 is rotated by means of the crank 21, the flexible elements 24 being reeled onto the drums 23, and traversing the sheaves 18 at the upper ends of the standards 14. The outer end of the conveyer frame 27, therefore, may be raised and lowered. When the conveyer frame is lowered in the manner hereinbefore set forth, the guide wheels 40, traversing the inclined braces 15, cause the conveyer frame to move to the left, reference being had to Fig. 1. When the conveyer frame 27 is raised, the frame obviously, will move to the right, referring to Fig. 1, and by the operations above described, the outer end of the conveyer frame may be positioned properly with respect to the vertical center of the stack which is being built up. As the conveyer frame reciprocates transversely of the vehicle, the rollers 29 ride along the inclined tracks 25.

The device forming the subject matter of this application is adapted to be used in connection with a wagon 41 having a drop side 42. The headed material in the wagon 41 may be permitted to traverse the drop side 42. The material from the drop side 42 will be received by the conveyer 34 and, when the shaft 31 is rotated, the material will be raised by the conveyer 34 and will be deposited on the top of the stack, in a manner which those skilled in the art will appreciate.

Attention is directed to my copending application No. 121,274 for Letters Patent on a grain-stacker, filed Sept. 20, 1916, and presenting an improved form. In application No. 121,274, I shall claim my invention as broadly as possible, this present application No. 101,376 being restricted to characteristic structural details, the patent maturing out of application No. 121,274 being permitted to issue before the patent maturing out of this application No. 101,376, or simultaneously therewith.

Having thus described the invention, what is claimed is:—

In a device of the class described, a vehicle; a standard fixed to and rising from the vehicle; a brace connecting the standard with the vehicle and inclined with respect to the vertical; a downwardly and outwardly inclined track disposed transversely of the vehicle and carried thereby, the inner end of the track being located adjacent the longitudinal center of the vehicle; an inclined conveyer frame disposed transversely of the vehicle and provided at its lower end with a roller engaging the track; means assembled with the standard and with the conveyer frame for raising and lowering the upper end of the conveyer frame; and spaced guiding elements carried by the conveyer frame and located on opposite sides of the brace, the guiding elements coacting with the brace to move the conveyer frame endwise, when the upper end of the conveyer frame is raised and lowered, the guiding elements being spaced apart by a distance greater than the width of the brace, and being adapted to cramp against opposite edges of the brace, when the upper end of the conveyer frame has been raised to a predetermined point, thereby to prevent the roller from riding off of the inner end of the inclined track.

In testimony that I claim the foregoing as my own, I have hereto affixed my signature in the presence of two witnesses.

THOMAS MAHONEY.

Witnesses:
F. M. CRABTREE,
J. C. GOODHEART.

Copies of this patent may be obtained for five cents each, by addressing the "Commissioner of Patents, Washington, D. C."